United States Patent [19]

Goldman et al.

[11] Patent Number: 4,654,879
[45] Date of Patent: Mar. 31, 1987

[54] CELLULAR MOBILE RADIO SUBSCRIBER LOCATION DETECTION

[75] Inventors: Stuart O. Goldman, Columbus; Leonard E. Bogan, Dublin, both of Ohio

[73] Assignee: ITT Corporation, New York, N.Y.

[21] Appl. No.: 717,623

[22] Filed: Mar. 29, 1985

[51] Int. Cl.[4] .......................... H04Q 7/00; H04Q 9/00
[52] U.S. Cl. ........................ 455/33; 455/32; 455/34; 455/54
[58] Field of Search ................ 455/32, 33, 34, 54, 455/56, 62; 179/2 EB

[56] References Cited

U.S. PATENT DOCUMENTS

| 4,430,753 | 2/1984 | Shiratani | 455/52 |
| 4,475,010 | 9/1984 | Huensch et al. | 455/56 |
| 4,527,284 | 8/1985 | Röttger | 455/33 |

OTHER PUBLICATIONS

Puhl et al., Method & Apparatus for Assigning Duplex Radio Channels & Scanning Duplex Radio Channels Assigned to Mobile & Port. Radiotelephones in Cell. Comm. Sys., Feb., 1984.

Primary Examiner—Benedict V. Safourek
Assistant Examiner—Elissa Seidenglanz
Attorney, Agent, or Firm—John T. O'Halloran; Thomas F. Meagher

[57] ABSTRACT

The locating function of a cellular mobile radio telephone system is implemented so that, when the locating radio detects a sustained change from a very low signal quality or amplitude (indicating background noise rather than an active call in an adjacent cell) to a higher quality or amplitude (indicating the start of a call in one of the adjacent cells), the radio will modify its filtering process so that previous sample values (which can be attributed, for example, to noise before the start of the call) will not be used in the averaging process. The result of this improvement is that values reported from the locating radio during the initial portion of the call (0 to 20 seconds) will not be reported artifically low. This allows the system to make decisions about handoff during this initial portion of the call. Additionally, rather than having the locating radio take equal samples from each of the possible voice channels, in accordance with the invention, there are two scanning tasks. The first task is to indeed look at all of the voice channels, and to establish a table of those channels with signal present. The second task is to look at only the channels in the table. The first scan task could be implemented either as a periodic scan occuring every n seconds or as a background task taking n seconds to complete. Since the second scan task has a vastly reduced number of channels to monitor, more samples can be taken in a unit time and thus the locating value reported to the system will be more accurate with less variation.

1 Claim, 4 Drawing Figures

CELLULAR MOBILE RADIO SUBSCRIBER LOCATION DETECTION

This invention relates to cellular mobile radio-telephony systems and, more particularly, to a method for use with a locating radio for monitoring the strength of signals transmitted from a mobile radio-telephony station of a mobile subscriber in order to select the next cell into which the mobile subscriber is to be handed off.

Systems of interest in understanding cellular mobile radio are disclosed in U.S. patent applications entitled "Cellular Mobile Radio Service Telephone System" of S. O. Goldman et al. having Ser. No. 457,155, filed Jan. 11, 1983; U.S. Ser. No. 622,939, filed June 21, 1984, entitled "Data Control For Telephone System"; U.S. Ser. No. 619,251, filed June 11, 1984, entitled "Hand-Off Filter For Cellular Mobile Radio"; and U.S. Ser. No. 622,941, filed June 21, 1984, entitled "Cellular Mobile Radio Hand-Off Utilizing Voice Channel", all assigned to the assignee hereof, which applications are incorporated by reference herein in their entirety.

Cellular radio-telephony is used at numerous sites in this country and overseas. Such a telephone system permits communication between two mobile telephone stations as well as between a mobile station and a fixed station.

Such systems are formed of clusters of cells wherein each cell is assigned a predetermined set of radio frequency (RF) channels for voice communications. The channels are spaced apart in the frequency spectrum so as to permit simultaneous transmisssion of many telephone conversations by many stations without interference between communications in the various channels. In order to insure that there is no interference between the assigned channels of one cell and the assigned channels of a contiguous cell, the individual channels in the contiguous cell are located at different portions of the frequency spectrum than the individual channels of the one cell. The same channels are repeated at more remote cells, and the power of the signal transmission in any one channel is limited in amplitude so as to become attenuated to a sufficiently low, non-interfering level, at the channels of the remote cell.

Cellular mobile radio-telephone systems are described in the literature. One such system referred to as an "Advanced Mobile Phone Service" is described in *The Bell System Technical Journal,* January 1979, Vol. 58, No. 1, pp. 1–269. Control of individual subscriber channels for communication via common RF link is accomplished, preferably, by means of statistical multiplexers. Such multiplexers are described in an article entitled "Controlling Data Communications: Statistical Multiplexer Moves In" by H. J. Hindin in *Electronics,* July 28, 1981, pp. 141–148, and in "A Buyers Guide to Today's Volatile Statistical Multiplexers" by J. H. Scharen-Guivel and A. A. Carlson in *Data Communications,* March 1982, pp. 97–126. A switching configuration for a mobile system is disclosed in "A Distributed Switching Approach to Cellular Coverage" by R. E. Pickett in *Telecommunications Magazine,* February 1983. A network control system for use in cellular mobile radio-telephony may include the commercially available ITT System 1210 hardware and software.

In the construction of a cellular system, a group of the foregoing cells is clustered about a system switching network which dynamically allocates the available channels in any one cell among the various mobile radio-telephones with which communication is desired at that instant. Such switching networks provide for the coupling of a telephone conversation of one channel in a first cell with a second channel in the first cell or a second cell or, alternatively, with a long-distance trunk circuit which connects the first cell with a desired cell in another cluster or with a fixed station. In addition, well-known control circuitry is provided for the transmission of command signals to the mobile stations for directing their respective transmissions on the allocated channels.

As a mobile station moves from one cell to the next cell, a hand-off procedure is followed wherein the central switching network commands the mobile station to switch frequency from the channel which was used in the first cell to the frequency of a new channel to be used in the second cell. A characteristic in hand-off decision-making circuitry presently in use is the measurement of the amplitude of signal reception from the mobile station. The communication system may include directional antennas and associated locating receivers at each cell site, the antennas designating specific azimuthal sectors showing generally the position of a mobile station with respect to a cell. Thus, the signal strength or quality can serve as an indication that the mobile transmitter is centrally located within a cell, or is located near the boundary of the cell. Thereby, by monitoring the amplitude or quality of such signals transmissions the decision-making circuitry of the hand-off apparatus is able to signal the system switching network at the appropriate time when a hand-off is to be made from one channel to another channel.

Under present regulations of the Federal Communications Commission (FCC), cellular mobile radio-telephone systems comprising a set of cells are allocated 333 channels of which 21 channels are limited to use for access and control purposes, such as the paging of a mobile station, while the remaining 312 channels are used for the transmission of voice and data. For example, the geographic area covered by the system may be divided into a cluster of fifteen cells having approximately twenty voice channels apiece, or a cluster of twenty cells having approximately fifteen voice channels apiece. The communication channels in each of the cells operate as part of common network under a network control system in which the twenty-one access channels are available for tasks including the servicing of call attempts from and paging of mobile stations. Each voice channel would be shared on a statistical basis among numerous subscribers, such sharing being possible because not all subscribers wish to communicate at the same time. Thus, each channel may handle 20 to 30 subscribers just as a trunk line is shared among many subscribers.

Known locating receivers scan all of the voice channels. On a given channel, since it does not know when a new call has started, it must continue to average the previous measurements with the most current. Hence, since all of the voice channels are being scanned, the number and quality of samples, of the particular channel which is under consideration for hand-off, is limited. Furthermore, the measurement which is filtered and averaged may contain information from a prior call on this channel or an idle channel prior to the start of the call that is the candidate for hand-off.

The aforementioned problem is overcome and other advantages are provided by a cellular mobile radio telephone system wherein the locating function is modified. In accordance with the invention, when the locating radio detects a sustained change from a very low signal quality or amplitude (indicating background noise rather than an active call in an adjacent cell) to a higher quality or amplitude (indicating the start of a call in one of the adjacent cells), the radio will modify its filtering process so that previous sample values (which can be attributed, for example, to noise before the start of the call) will not be used in the averaging process. The result of this improvement is that values reported from the locating radio during the initial portion of the call (0 to 20 seconds) will not be reported artificially low. This allows the system to make decisions about handoff during this initial portion of the call. Additionally, rather than having the locating radio take equal samples from each of the possible voice channels, in accordance with the invention, there are two scanning tasks. The first task is to indeed look at all of the voice channels, and to establish a table of those channels with signal present. The second task is to look at only the channels in the table. The first scan task could be implemented either as a periodic scan occuring every n seconds or as a background task taking n seconds to complete. Since the second scan task has a vastly reduced number of channels to monitor, more samples can be taken in a unit time and thus the locating value reported to the system will be more accurate with less variation. It should be noted that both schemes make use of the intelligence in the locating receiver, and do not require any additional per cell data to be downloaded to the locating receiver from the system controller at startup. The locating function of the invention does not increase the required communications between the cell and the system controller.

The aforementioned aspects and other features of the invention are explained in the following description taken in connection with the accompanying drawing wherein.

Figure 1:
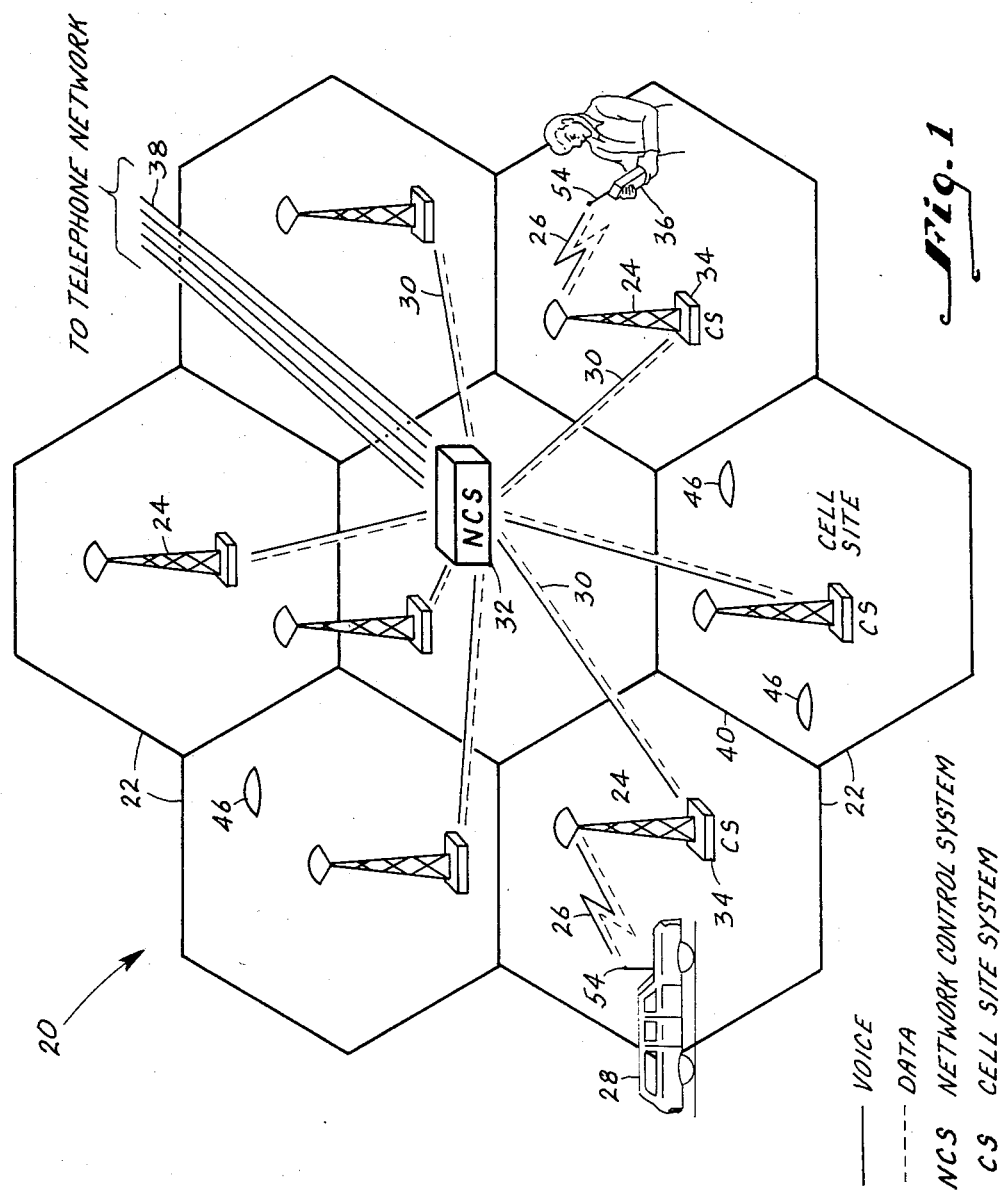
FIG. 1 is a diagrammatic view of a cellular mobile radio telephone system showing the various communication links whereby control and data signals are transmitted among mobile subscribers, stationary subscribers, and the transceiving stations of the respective cells.

In FIG. 1 there is shown a typical cellular radio-telephone system 20 comprising a set of contiguous cells 22, each cell 22 being the site of an antenna 24 by which a radio communication link 26 is established with a mobile subscriber such as a vehicle 28. The cells 22 are connected via communication links 30, which links may employ radio or cable, to a network control system 32. At the site of each cell 22, a system 34 incorporating transponder equipment (not shown in FIG. 1) connects with the antenna 24 for communication via a link 26 to a mobile subscriber and via a link 30 to the network control system 32.

The network control system 32 provides for communication between mobile subscribers in the same cell or two different cells, such as between the vehicle 28 in one cell 22 and a portable telephone 36 in a second cell 22, as well as with a stationary subscriber via trunk line 38 of a telephone network. Each of the links 26 and 30 includes both voice/data signals and control signals represented, respectively, by solid and dashed lines. The control signals carry the identity of a called subscriber in another one of the cells 22, as well as that of a mobile or stationary subscriber at a distant location which is to be reached via the system 32 and the trunk lines 38. The control signals also carry information with respect to a designated channel to be employed by a cell system 34 in communicating with a mobile subscriber.

As a mobile subscriber passes from one cell to the next cell, a hand-off procedure is followed at the interface between the two cells 22, such interface being in the vicinity of a border 40 between the two cells. The network control system 32 performs the hand-off procedure wherein, in accordance with established and well-known practice, a mobile subscriber such as the vehicle 28 is assigned a new channel for transmission of voice and data along a link 26 to the system 34 of the new cell. It is noted that the frequencies of the voice transmission channel allocated to one of the cells 22 differs from those allocated to the contiguous cells 22. Thereby, each of the mobile subscribers has a separate channel so that there is no confusion as to the subscriber signals, particularly near a border 40 wherein the signal of two vehicles 28 would be present on both sides of the border 40. The amplitudes of the transmitted signals of the respective subscribers are maintained below a predetermined limit so as to avoid interference at longer distances spanning many of the cells 22. Thereby, at the longer distances, the same channels can be reallocated without interference from a distant subscriber operating within the same channel.

The hand-off procedure is based on the location of the subscriber and the amplitude of or quality of signals received at a cell site from the subscriber via a link 26. The antenna 24 is positioned approximately at the middle of a cell 22 so that transmissions of a subscriber become attenuated as the subscriber moves toward the border 40. In addition, the antenna 24 includes sector antenna elements which provide information as to the location of the subscriber to enable determination of the cell toward which a subscriber is moving. This information is communicated via control signal to the network control system 32 which then selects a free channel in the new cell, and directs the transceiver operated by the subscriber to switch to the new frequency allocation.

Figure 2:
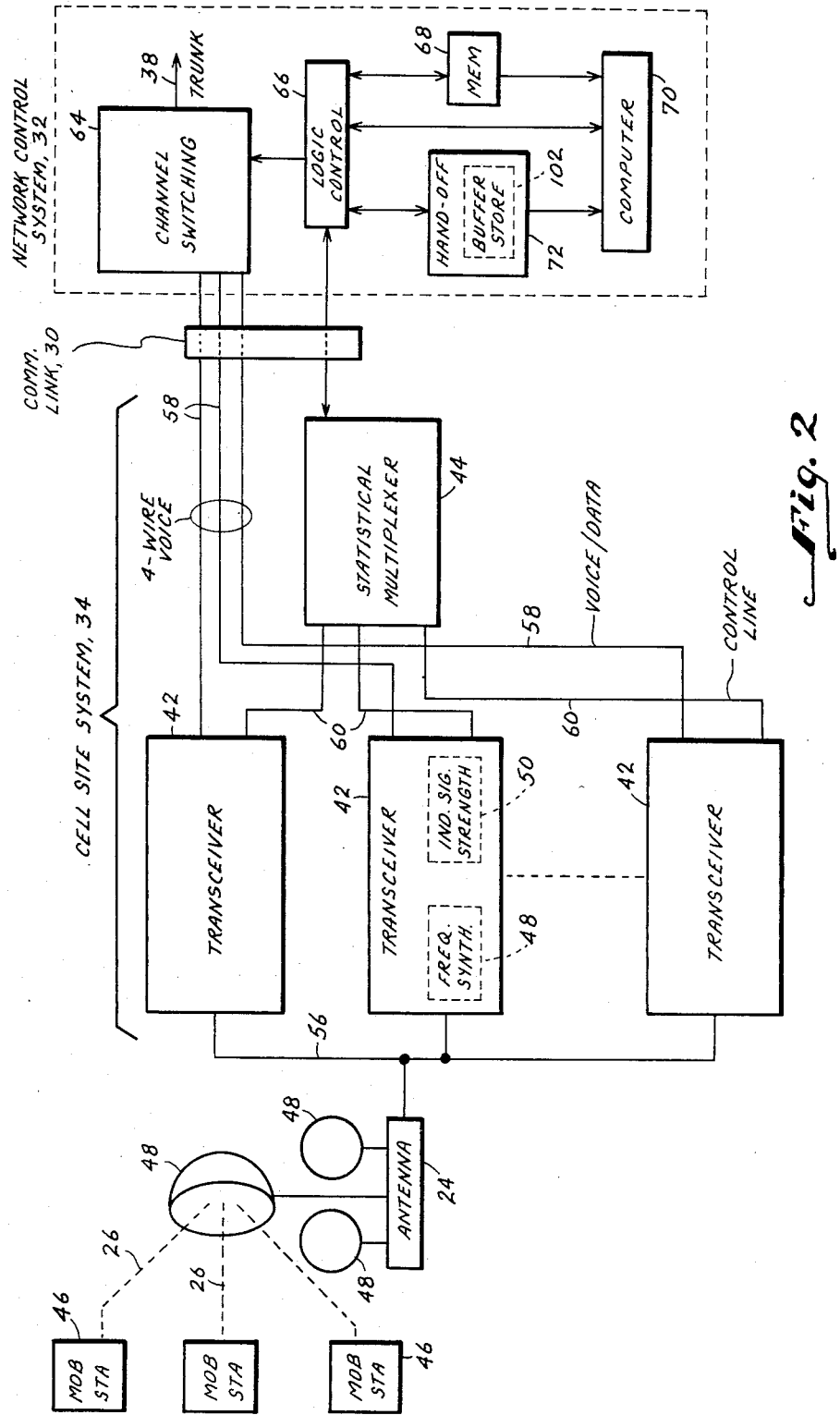
FIG. 2 is a block diagram showing the interconnection of transceivers at the cell site system hand-off apparatus of the network control system.

With reference also to FIG. 2, there is shown a simplified presentation of components of the system 20, the presentation showing only those portions of the system 20 which are necessary for an understanding of the operation of the cell site system 34 in cooperation with the network control system 32 in carrying out the handoff procedures of the invention. The system 34 includes a set of transceivers 42 and a statistical multiplexer 44. One transceiver 42 is provided for each voice channel. Control signals for operation of the transceivers 42 are multiplexed at the multiplexer 44 and are transmitted along with 4-wire voice signals of the transceivers 42 via the communication link 30 to the network control system 32.

FIG. 2 further shows the connection of the cell site system 34 to a set of mobile subscribers 46 via the communication links 26 from antenna 24. The transmit-receive stations of the mobile subscribers 46 are understood to include the vehicle 28 and the portable telephone 36 of FIG. 1 as well as other forms of mobile stations indicated diagrammatically in FIG. 1. The antenna 24 includes an array of antenna elements 48 which provide azimuthal coverage about a cell 22, one of the elements 48 being shown communicating via the links 26 to subscriber 46. The array of elements 48 provide information as to the direction of a subscriber 46 from the site of the antenna 24, thereby to indicate which portion of a border 40 of a cell is to be involved in a hand-off procedure.

The electrical circuitry employed in a mobile subscriber station 46 is well known and, accordingly, it is not shown in FIG. 2. Briefly, the circuitry of a subscriber station 46 includes a telephone coupled via a transceiver to an antenna. Operation of the transceiver is controlled by a microprocessor including a memory which stores information such as the identity of the subscriber. The transceiver includes a transmitter and a receiver, both of which are individually tuneable to specific frequencies commanded by the microprocessor via control signals transmitted along the links 26. Thus, the microprocessor is used to tune the receiver and the transmitter to the transmission and reception frequencies of the specific voice channel assigned to the mobile station of the subscriber 46. The memory also stores a program for the microprocessor used in responding to paging and hand-off command signals received via a link 26. The command signals transmitted via the link 26 are in digital format, these signals being decoded by decoder circuitry at the subscriber station 46.

A specific embodiment of the invention will be described with respect to a CMRS system incorporating transceivers which share a voice and a locating function, as described in the aforementioned patent application U.S. Ser. No. 622,941, filed June 21, 1984, entitled "Cellular Mobile Radio Hand-Off Utilizing Voice Channel". However, the invention may be employed in other CMRS systems, including those with dedicated locating receivers, such as disclosed in the aforementioned patent application "Cellular Mobile Radio Service Telephone System" of S. O. Goldman et al. having Ser. No. 457,155, filed Jan. 11, 1983. Each of the transceivers 42 includes a frequency synthesizer 48 and a received signal strength indicator 50. As will be described in further detail hereinafter, the synthesizer 48 is responsive to a digital command signal generated at the network control system 32 and transmitted via the multiplexer 44 for tuning a receiver of the transceiver 42 to the transmission frequency of a mobile subscriber station 46 operating in conjunction with an adjacent cell 22, thereby to participate in a locating function. In the absence of such command signal to the synthesizer 48, the transceiver 42 operates on its preassigned transmission and reception frequencies. The signal strength indicator 50 serves in a dual capacity. During normal operation of the transceiver 42 for the transmission of voice and data signals over a voice channel, the indicator 50 monitors the strength of the voice signal and, in the event that the strength drops below a predetermined value, sends a signal to the network control system 32 indicating that a hand-off to a voice channel in another cell is desired. Alternatively, when the transceiver 42 is utilized for locating a mobile subscriber station 46, the indicator 50 provides a digital signal indicating the magnitude of the subscriber signal for use in the hand-off operation of the network control system 32.

The indicator 50 may be located at a point of convenience in the fabrication of the system 20. Accordingly, the indicator 50 may be located at the site of the network control system 32 wherein access may be had to voice signals communicated between the cells 22, or the indicator 50 may be located at each of the cell site systems 34 at which points connection can be made with the voice channels. For example, such connection may be made on a time-shared basis. In either of the foregoing arrangements, a suitable indication of signal strength along a link 26 is obtained for use in the decision-making process involved in a hand-off. In the arrangement disclosed in FIG. 2, individual ones of the indicators 50 are provided in each of the transceivers 42 for individually monitoring each of the voice channels at each of the cell site systems 34.

As will be described hereinafter in further detail, each of the transceivers 42 comprises a transmitter 52 and a receiver 54 (FIG. 3) which are coupled via line 56 to the antenna 24, and to the network control system 32 via a line 58 representing the aforementioned 4-wire voice connection. The aforementioned control signals are coupled between the transceivers and the multiplexer 44 by lines 60, and from the multiplexer 44 to the system 32 via line 62. Also shown in FIG. 2 is a simplified block diagram depicting the components of the network control system 32. It is to be understood that the general operation of a network control system, such as the system 32, is well known and, accordingly, the presentation in FIG. 2 has been simplified so as to point out only those components necessary for an understanding of the operation of the invention. The system 32 includes switching equipment 64 connecting with the lines 58, the 4-wire lines 58 permitting two-way communication of voice signals between the transceivers and the switching equipment 64. The switching equipment 64 provides for the switching of signals among different ones of the assigned channels in different ones of the cells 22. Associated with the channel switching equipment 64 is a logic control unit 66, a memory 68, and a computer 70. The memory 68 stores the identifications of subscribers engaged in communications with each other, as well as the identification of the specific channels over which they are communicating. Also stored are the identities of channels available for use by the subscribers. The computer 70 connects with the logic unit 66 and the memory 68 for directing the switching equipment 64 to institute connections between the various channels so as to connect the individual subscribers engaged in their respective communications. Thereby, two-way communication is attained between a mobile subscriber station 46 along a link 26 with the antenna 24, the two-way communication path continuing from the antenna 24 via the line 56 to a transceiver 42, and from the transceiver 42 via a line 58 to the switching equipment 64.

The network control system 32 further comprises a hand-off unit 72 connected between the computer 70 and the logic control unit 66. By this connection, the computer 70 directs a switching of channels to accomplish a hand-off procedure. The hand-off unit 72 is involved in decision-making procedures which determine when and if a hand-off is to be instituted. While the hand-off unit 72 is shown separate from the computer 70 so as to facilitate explanation of the invention, it is to be understood that, in a typical commercially available system, the decision-making procedures would be accomplished within circuitry of the computer 70 under suitable programming of the computer 70. Of course, in the event that heavy traffic may overload the computer, then the hand-off circuitry can always be provided as an additional unit separate from the computer, which circuitry would be connected as shown by the hand-off unit 72 in FIG. 2. The logic control unit 66 is responsive to signals on line 62 from the statistical multiplexer 44 for applying these signals to the memory 68, the computer 70, and the hand-off unit 72 in accordance with protocol and identity of the respective signals. Command signals generated by the computer 70 and the hand-off unit 72 are applied to the logic unit 66 for transmission via line 62 to the multiplexer 44. In particular, the hand-off unit 72 is responsive to signals on line 60 from the indicator 50 of the current voice channel requesting a hand-off. The computer 70 transmits frequency command words via the lines 62 and 60 to the frequency synthesizer 48 in a transceiver 42 for tuning the transceiver 42 to locate specific mobile subscriber station 46. Prior to a hand-off, the hand-off unit 72 receives signals from each of a set of the cells 22 of FIG. 1 surrounding a mobile subscriber station 46, these signals being received from indicators 50 in designated transceiver 42 of respective ones of the cells, thereby to obtain a set of measurements of signal strength as observed in each of the cells surrounding the mobile station. With the aid of the computer 70, and using programs as are currently employed in cellular mobile radio systems, the computer 70 with the hand-off unit 72 compares the relative amplitudes of the signals or quality of respective ones of the signals 50 to ascertain which of the cells receives the best signal. The hand-off is ordered to the cell receiving the best signal.

Figure 3:
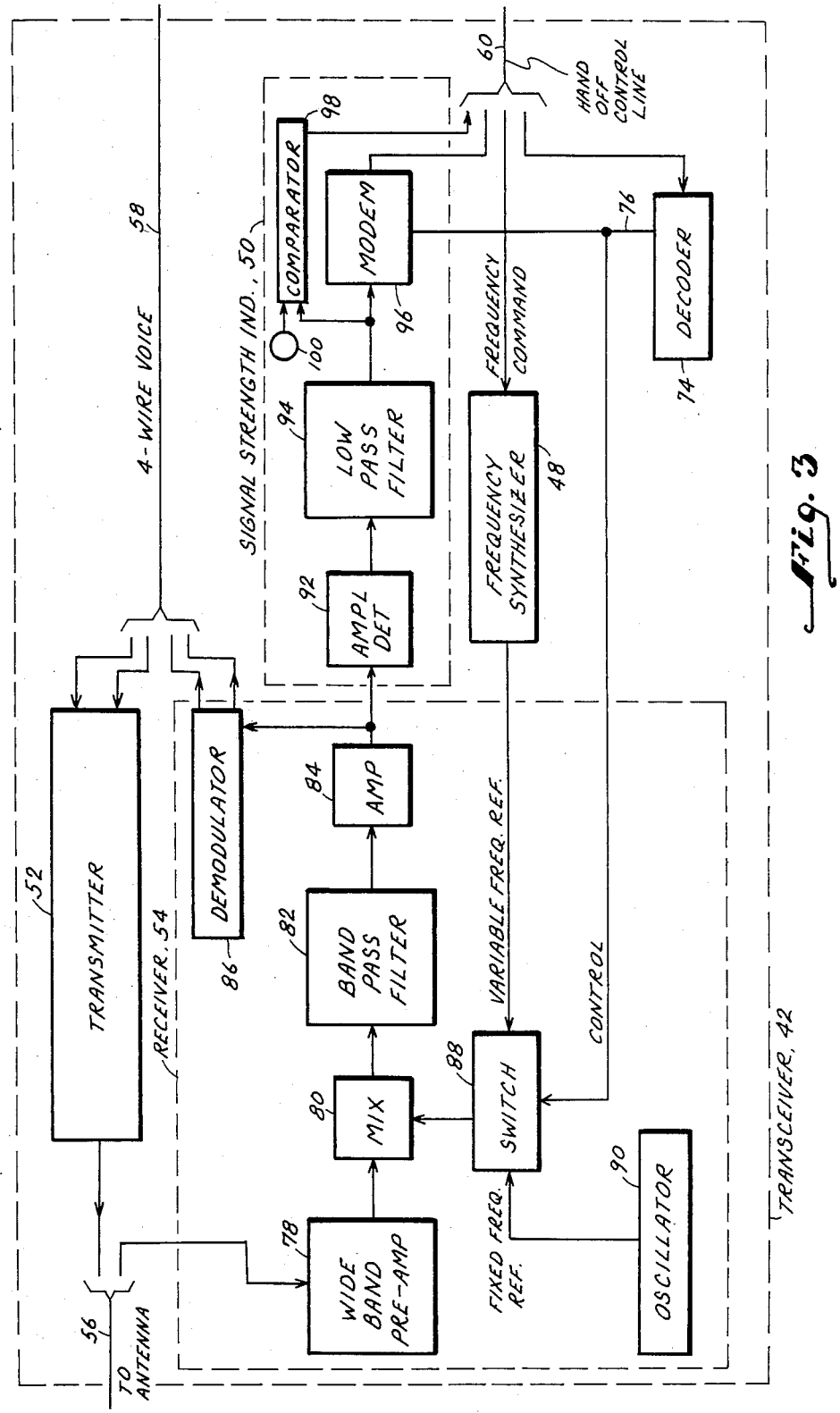
FIG. 3 is a block diagram of circuitry incorporated within a transceiver of FIG. 2.

With reference also to FIG. 3, the components of a transceiver 42 and their operation in the hand-off procedure of the invention will be better understood. FIG. 3 shows the aforementioned transmitter 52, receiver 54, synthesizer 48, and indicator 50. In addition, the transceiver 42 comprises a decoder 74 connected to the line 60 for decoding the digitally-formatted signals on line 60 to provide command signals on line 76 for use by the receiver 54 and the indicator 50. The receiver 54 comprises a wide band preamplifier 78, a mixer 80, a band pass filter 82, an amplifier 84, a demodulator 86, a switch 88, and an oscillator 90. The indicator 50 comprises an amplitude detector 92, an intelligent filter 94, a modem 96, and a comparator 98. The intelligent filter 94 may comprise a microprocessor, a programmable logic array, or any other suitable equivalent.

In operation, the transmitter 52 receives a voice signal on two of the wires of lines 58, and transmits the signal via line 56 and the antenna 24 to a mobile subscriber station 46. The preamplifier 78 of the receiver 54 receives incoming signals of the station 46 via the antenna 24 and line 56. The frequencies of transmission and reception are sufficiently widely spaced along the frequency spectrum so as to prevent any significant interference between transmitted and received signals. The preamplifier 78 has sufficient bandwidth to encompass all frequencies which may be transmitted along the voice channel from the mobile station 46. The oscillator 90 provides a reference signal having a fixed frequency, the reference signal being coupled by the switch 88 to the mixer 80. The mixer 80 mixes the output signal of the preamplifier 78 with the reference signal to provide an intermediate frequency signal to the filter 82. The passband of the filter 82 is equal to the bandwidth of a single voice channel. The frequency of the reference signal is preset in accordance with the specific channel to which the receiver 54 is tuned.

Thus, only one input voice signal will be passed by the filter 82, this corresponding to the value of frequency to which the oscillator 90 has been preset. The output signal of the filter 82 is amplified by the amplifier 84 and applied to the demodulator 86. Depending on whether amplitude modulation, phase modulation, or frequency modulation has been employed by the mobile station 46, the demodulator 86 comprises well-known demodulation circuitry for demodulating either the amplitude modulation, the phase modulation, or the frequency modulation to provide the voice signal on two wires of the line 58. Thereby, the signal received by the transceiver 42 is applied via the line 58 and the communication link 30 to the network control system 32.

The indicator 50 operates as follows. The detector 92 receives the voice signal at the intermediate frequency from the amplifier 84 and detects the amplitude or quality thereof. The output signal of the detector 92 is applied to the filter 94. Thus, the combined action of the detector 92 and the filter 94 is to provide a signal at the output of the filter 94 indicative of the true strength of the received signal from the mobile. Any rapid fluctuations in the incoming voice signal are averaged by the filter 94. Thus, the output signal of the filter 94 may be regarded as a smoothed measurement of the RF amplitude of the incoming voice channel signal.

In the prior art, during each time interval T, a new sample $S_i$ is taken of the signal quality and is added to the summation of all the previous fixed number N samples, while at the same time the oldest sample is subtracted from the summation and is discarded. The summation is then divided by the fixed number of samples N to produce the running average signal quality during arbitrary time period n, as follows:

$$\frac{\overset{n}{\underset{i = n - N + 1}{\text{Sum } S_i}}}{N}$$

In an embodiment of the invention, when the sustained change from a very low signal quality occurs, to a higher quality, the intelligent filter 94 removes all of the previous samples from further consideration and the fixed number of samples is replaced by the number j of samples since the sustained change occurred which start at one and increases by one each time period T until j=N, at which point the above algorithm is used, as follows:

$$\frac{\overset{j}{\underset{i = 1}{\text{Sum } S_i}}}{j}$$

where $S_1$ is a sample taken during the time period of the occurrence of the sustained change.

The definition of a sustained change is highly dependent on the characteristics of the particular operating environment. For an illustrative example, one could consider requiring four successive samples which are greater than four decibels above both the average and the four most current samples. Many other criteria for deciding that a sustained change has occurred are equally viable and should be used as warranted.

Thus, when the locating radio detects a sustained change from a very low signal quality or level (indicating background noise rather than an active call in the adjacent cell) to a higher quality or level (indicating the start of a call in one of the adjacent cells), the radio will modify its filtering process so that previous sample values (which can be attributed to noise before the start of the call) will not be used in the averaging process. A result of this improvement is that values reported from the locating radio during the initial portion of the call (e.g., zero to twenty seconds) will not be reported artificially low. This allows the system to make decisions about hand-off during this initial portion of the call.

The output amplitude measurement of the filter 94 is compared by the comparator 98 with a reference signal from a reference source 100 to provide an output signal when the measured amplitude or signal quality drops below the value of the reference signal. Thus, the output signal of the comparator 98 serves as a request for a hand-off which is transmitted via the line 60 and the multiplexer 44 to the network control system 32. The request for the hand-off by the comparator 98 occurs whenever the measured voice channel amplitude drops below the preset reference signal of the source 100. The foregoing operation pertains to the use of the transceiver 42 for transmission of voice/data signals in an assigned voice channel.

The transceiver 42 can also be utilized as a component of an access channel in which case the transceiver 42 participates in the locating function for determining into which cell 22 a mobile subscriber station 46 is to be handed off. In the performance of the locating function, typically, several transceiver 42 in a cluster of cells surrounding the mobile station 46 participate. The transceiver 42 in each of the cells is tuned to the frequency of the voice transmission channel of the particular mobile station 46 which has requested a hand-off. The respective transceivers 42 participating in the locating function provide a set of measurements of subscriber transmitted signals as received in the corresponding ones of the cells 22. These measurements are then communicated by the lines 60 to the network control system 32 which then compares the measured signal strength to select the cell 22 reporting the strongest signal. The mobile station 46 is then handed off to cell 22 reporting the best signal.

It is also that the indicator 50 is operative for measuring the strength of a voice signal received by the receiver 54 when the receiver 42 is operating in its normal mode of communicating a voice signal along a preassigned channel. This result occurs due to the fact that an output signal is produced by the filter 94 whether the transceiver 42 is tuned to its assigned communication channel or whether it is tuned for the locating function. Accordingly, by way of an alternative procedure in the hand-off operation, a measured signal amplitude or quality can also be provided by the transceiver 42 which is communicating the voice signal of the mobile source 46 which has requested the hand-off. In the alternative mode, the hand-off procedure of the network control system 34 would also provide for the comparison of the amplitude measurement of the foregoing transceiver with the measurements of the other several transceivers. In the event that the foregoing transceiver 42, which carries the communication of the mobile station 46 prior to the hand-off, were to show a better signal than any of the other transceivers participating in the locating function, then the hand-off would be delayed until such time as the signal measurement reported by another cell exceeds that reported by the transceiver presently carrying the mobile station transmission.

The operation of the transceiver 42 is switched from normal operation to the locating function by a digital command word transmitted over the line 60 from the multiplexer 44 to the decoder 74. The decoder 74 decodes the command word to provide a signal on line 76 which activates the modem 96 and the switch 88. The modem 96 includes well-known analog-to-digital conversion circuitry and converts the analog signal appearing at the output of the filter 94 to a multi-bit digital word which is transmitted along the line 60 to the multiplexer 44, and then via the line 62 to the network control system 32. The signal transmitted by the line 96 is the amplitude of the voice signal received by the receiver 54. Upon activation of the switch 88, a variable frequency reference from the synthesizer 48 is applied by the switch 88, in lieu of the fixed frequency reference, to the mixer 80. The frequency synthesizer 48 employs well known commercially available circuitry such as a phase locked loop employing a digital divider in the feed back loop, which divider operates in response to a frequency command word generated in the network control system 32 and applied via the multiplexer 44 and line 60 to the synthesizer 48. By use of the reference signal provided by the synthesizer 48, the receiver 54 is tuned to a different transmitted value of voice signal from a mobile subscriber station 46. The frequency command signal is generated by the computer 70 (FIG. 2) in cooperation with the hand-off unit 72 and the memory 68, and is applied to all of the transceivers 42 which are participating in the locating function. Thereby, the receivers 54 of the respective transceivers 42 are all tuned in to the same frequency transmission from the mobile station 46. Prior to the hand-off, the mobile station 46 is broadcasting at a preassigned frequency, which frequency is stored in the memory 68. The locating function is thus attained by tuning the receivers 54 to the value of frequency stored in the memory 68 for the specific one of the mobile stations 46 which has requested a hand-off.

In accordance with another feature of the invention, rather than having the locating radio take equal samples from each of the possible voice channels, two scanning tasks are employed. The first task is to indeed look at all of the voice channels, and to establish a table of those channels with signal present. The second task is to look at only the channels in the table.

Figure 4:
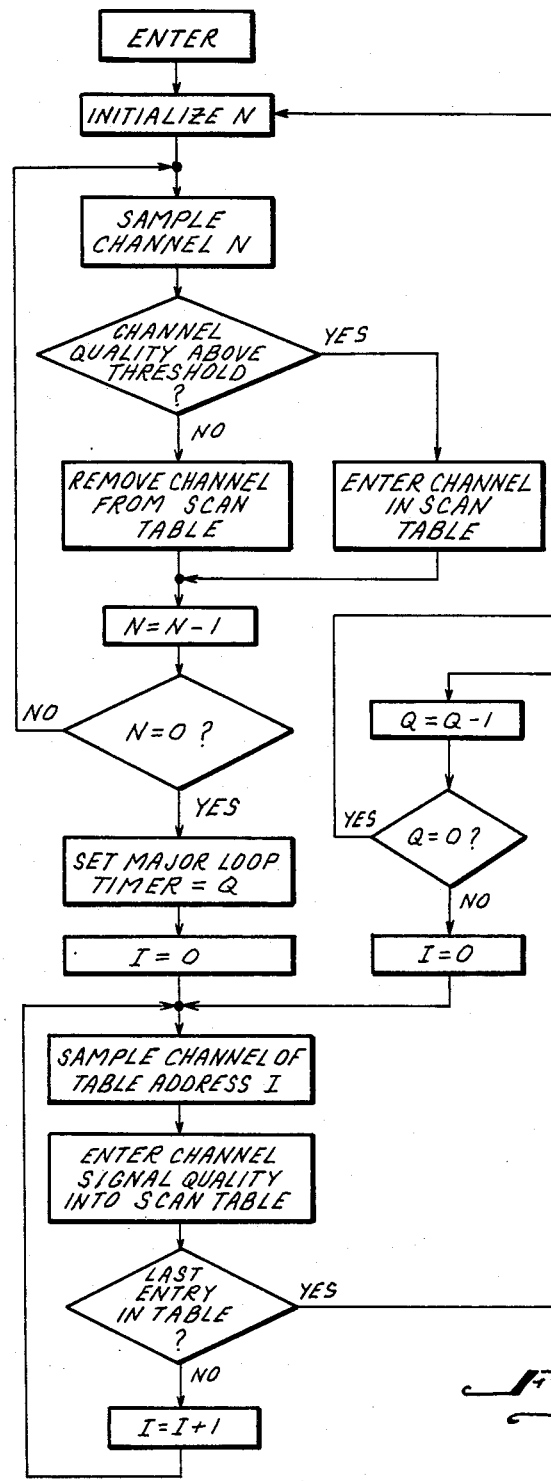
FIG. 4 is a flow chart disclosing a feature of the invention.

The first scan task could be implemented either as a periodic scan occuring every predetermined time period k or as a background task taking the predetermined time period k to complete. Since the second scan task has a vastly reduced number of channels to monitor, more samples can be taken in a unit time and thus the locating value reported to the system will be more accurate with less variation. A flow chart showing an example of an algorithm to accomplish the locating scanning task scheme is shown in FIG. 4.

Both the modified filtering process scheme and the locating scanning task scheme make use of the intelligence in the locating receiver, and do not require any additional per-cell data to be downloaded to the locating receiver from the system controller at startup. These improvements do not increase the required communications between the cell and the system controller.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

We claim:

1. A filtering method for a locating function of a cellular mobile radio system, wherein signal quality values are periodically sampled and averaged, comprising:

monitoring signal presence in voice channels;

establishing a table of said voice channels determined to have a signal present therein;

sampling, during each time period of predetermined time duration T, signal quality only of voice channels in said table;

monitoring signal quality only of said voice channels in said table;

adding a signal quality value sampled during a present time period to a summation of all N previous periodically sampled signal quality values, while subtracting the Nth oldest periodically sampled signal quality value from said summation where N is an integer;

dividing said summation by a divisor equal to N to produce a running average signal quality where N equals the number of periodically sampled signal quality values;

removing all of the previous periodically sampled signal quality values from further consideration when a sustained change from a low signal quality to a higher quality is detected; replacing all said previous periodically sampled signal quality values by adding a signal quality value sampled during a present time period, after detecting said sustained change, to a summation of all N previous periodically sampled signal quality values while subtracting the Nth oldest periodically sampled signal quality value from said summation; and producing said running average signal quality after detecting said sustained change by replacing said divisor with a number equal to the number of time periods occurring after detecting said sustained change which start at the number one and increases by one each time period until the Nth time period, where N is a predetermined fixed number.

* * * * *